March 18, 1958 S. R. GILFORD 2,827,040
AUTOMATIC SPHYGMOMANOMETER
Filed Sept. 30, 1954 6 Sheets-Sheet 1

INVENTOR
Saul R. Gilford
BY
Arthur Vinograd
ATTORNEY

INVENTOR
Saul R. Gilford
ATTORNEY

March 18, 1958     S. R. GILFORD     2,827,040
AUTOMATIC SPHYGMOMANOMETER
Filed Sept. 30, 1954     6 Sheets-Sheet 3
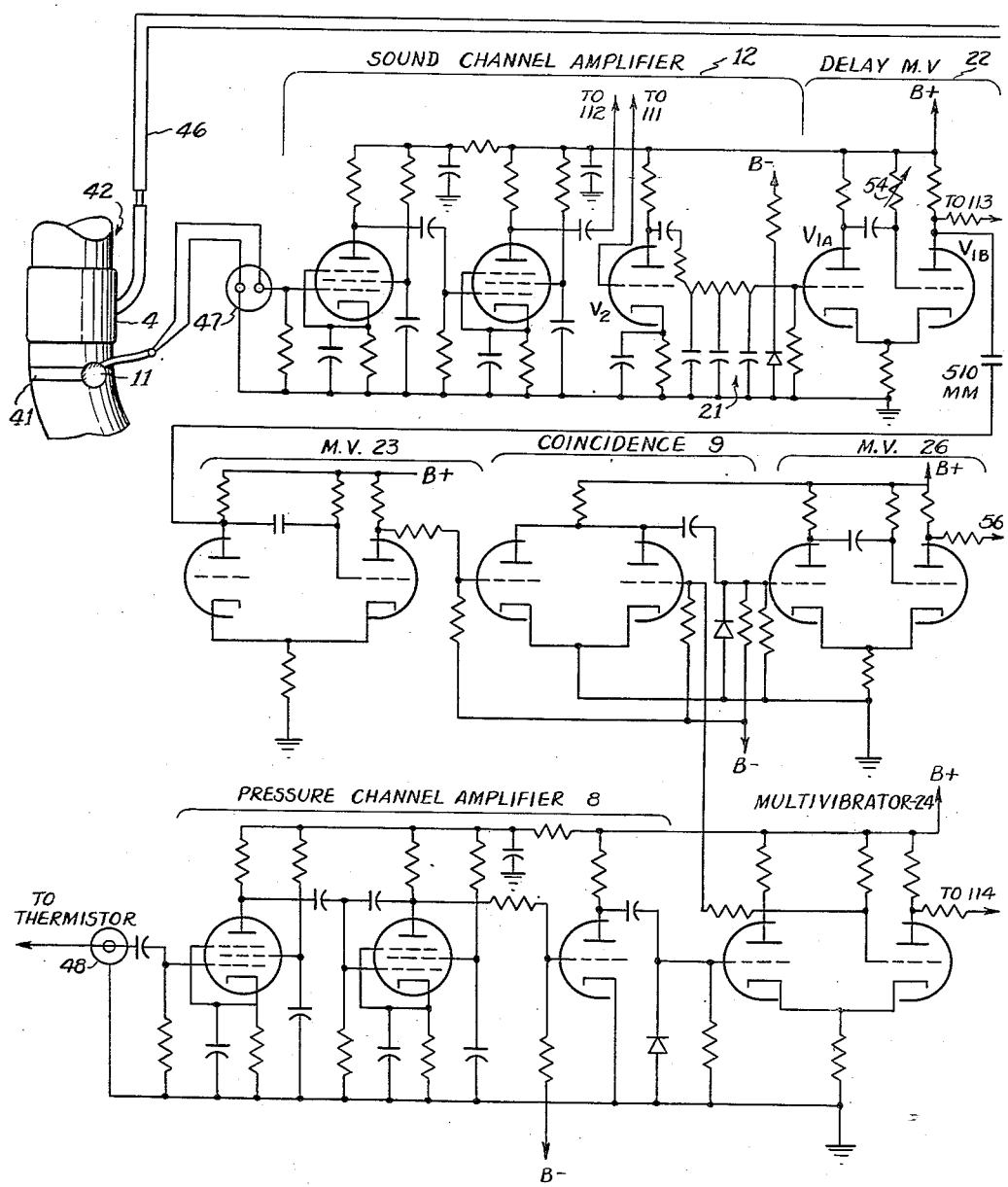
Fig. 3-A
INVENTOR
Saul R. Gilford
BY
Arthur Vinograd
ATTORNEY

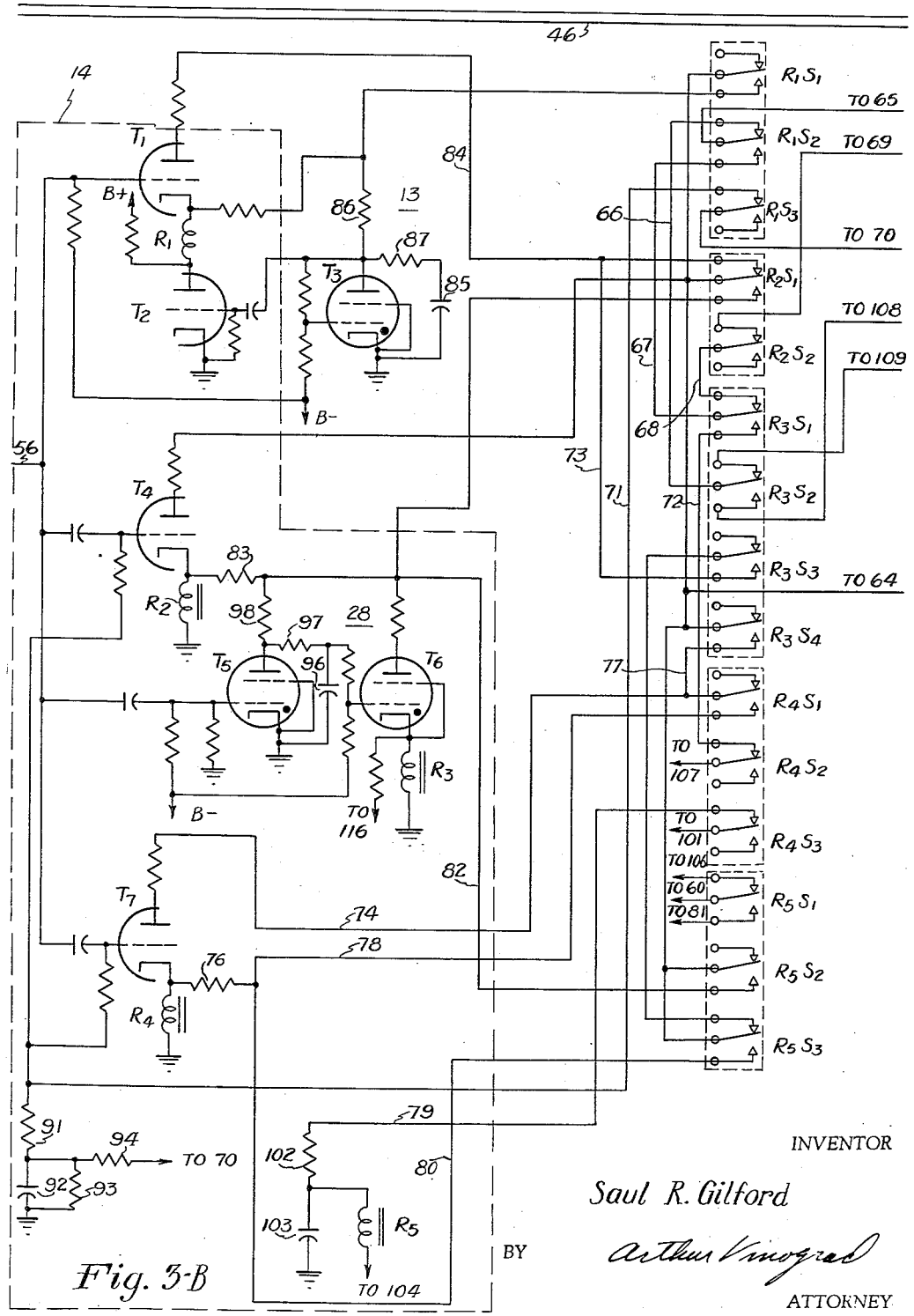

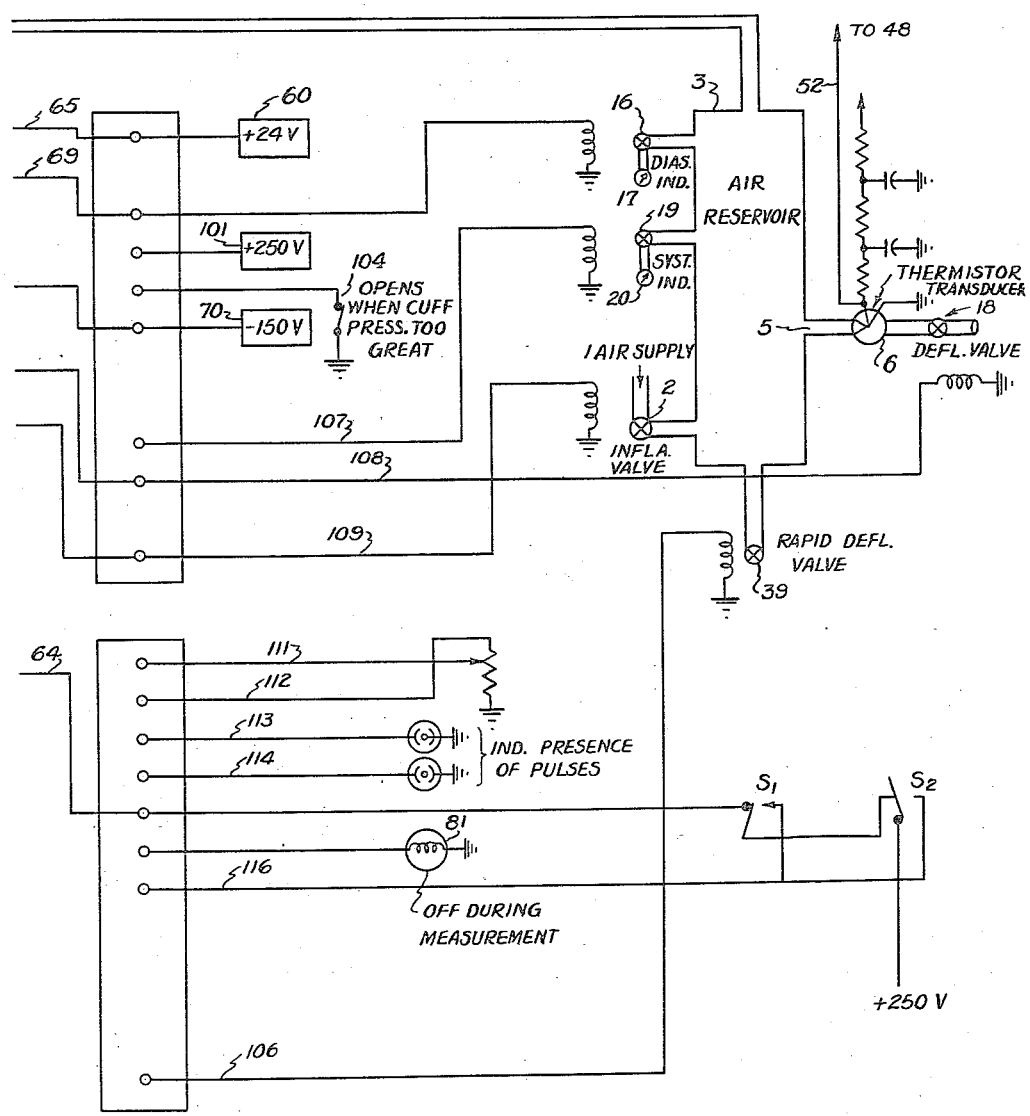
Fig. 3-C
Fig. 3-D
INVENTOR
Saul R. Gilford
BY Arthur Vinograd
ATTORNEY United States Patent Office 2,827,040
Patented Mar. 18, 1958

2,827,040

AUTOMATIC SPHYGMOMANOMETER

Saul R. Gilford, Oberlin, Ohio, assignor to the United States of America as represented by the Secretary of Commerce Application September 30, 1954, Serial No. 459,569

16 Claims. (Cl. 128—2.05)

This invention relates to apparatus for measuring blood pressure and more particularly to an automatic sphygmomanometer for determining the diastolic and systolic blood pressures of a human being.

Arterial blood pressure in man can be measured in several ways. One method which might be called the direct method is to insert a needle or cannula directly into the artery. A needle or cannula inserted into the artery enables one to bring the pressure out of the system, whereby employing one of several specially designed manometers it is possible to dynamically record the cyclic pressure variations in the vessel. As a routine procedure, however, this type of measurement is not convenient to make because it is time consuming and because the procedure of cannulating the artery and maintaining a tight clot and air-free system requires skillful technique. Furthermore, it requires that the patient remain immobile, and occasionally causes arterial injury and patient discomfort.

Two other methods which might be called indirect methods are of importance. They are both concerned with sphygmomanometers and will be referred to as the pressure method and the sound method. Both methods are indirect ones in that they are based on the consideration that flow in an artery can be occluded if pressure applied externally to the vessel is equal to or greater than the internal pressure. For most diagnostic work it is necessary to know only the maximum and minimum excursions of the blood pressure and a plot of the complete cyclic variation of the pressure is not required. The maximum and minimum are denoted as the systolic and diastolic pressure points, respectively.

The sphygmomanometer is a clinical instrument for measuring the maximum and minimum pressure in the extremities. It consists of an inflatable cuff which is wrapped around the arm, a manometer for indicating pressure in the cuff, and an inflating bulb. The measurement is made by inflating the cuff until the artery in the arm is occluded.

A major difficulty in prior art devices employing sound detection has been the inability of these sphygmomanometers to differentiate the desired signals from spurious undesired noise. These noise signals are due to various causes particularly movement of the patient and very often work on the bony structure during surgery.

One of the important features of the present invention is to overcome this drawback by incorporating a system in the sphygmomanometer which practically eliminates the possibility of an inaccurate measurement being taken as a result of the device being unable to distinguish between desired sound signals from the artery and noise signals.

One object of this invention is to provide a sphygmomanometer capable of measuring systolic and diastolic pressure with good accuracy and repeatability.

Another object is to provide an improved automatic sphygmomanometer that is direct indicating, with an output that can be displayed and recorded.

Another object of this invention is to provide an improved automatic sphygmomanometer which gives a direct indication of the systolic and diastolic pressure values requiring no interpretation by the observer.

A further object of this invention is to provide an improved automatic sphygmomanometer which gives a direct indication and record of the systolic and diastolic pressure values requiring no interpretation by the observer.

An additional object of this invention is to provide an improved automatic sphygmomanometer which gives a continuous direct indication and record of the systolic and diastolic pressure values requiring no interpretation by the observer.

A still further object is to provide an improved automatic sphygmomanometer which gives a simple direct display of only the most recent measurement and will retain this until another measurement is made.

Still another object is to provide an improved automatic sphygmomanometer that can be simply applied and requires no special skill.

A further object is to provide an improved automatic sphygmomanometer that is insensitive to disturbances such as room noise, moderate movement of the patient, and manipulation of the patient by the surgeon and his assistants.

A still further object is to provide a sphygmomanometer which causes no discomfort to the patient, which in effect means that the cuff should remain inflated for a minimum period of time, or no longer than is usual for manual determinations.

An additional object is to provide a sphygmomanometer that is safe for unattended operation. This means that safeguards are incorporated that prevent breakdown of equipment from keeping the cuff inflated for long periods of time or applying excessive pressures.

Other uses and advantages of the invention will become apparent upon reference to the specification and drawings.

Fig. 1 shows a functional block diagram of an embodiment of the present invention and Figs. 1A–1H show the functions of various elements of Fig. 1;

Figure 4:
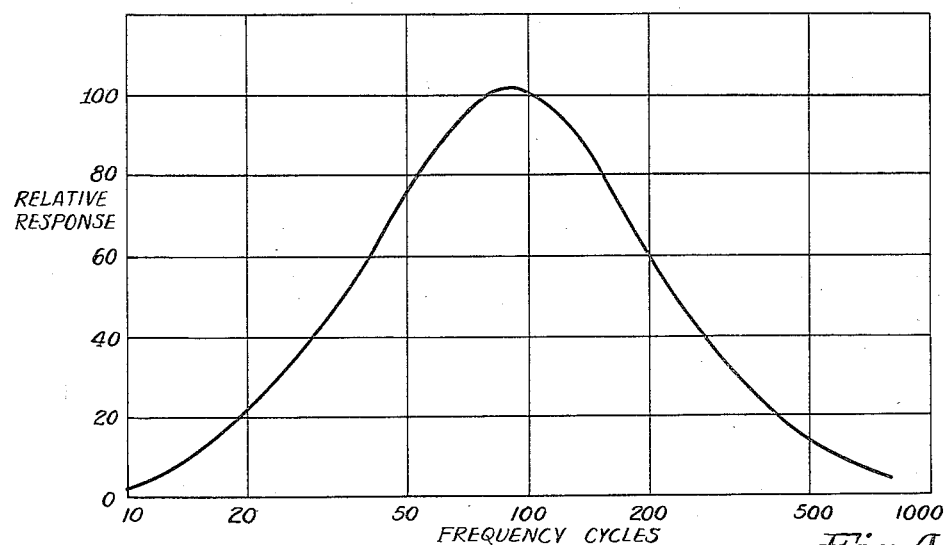
Figure 5:
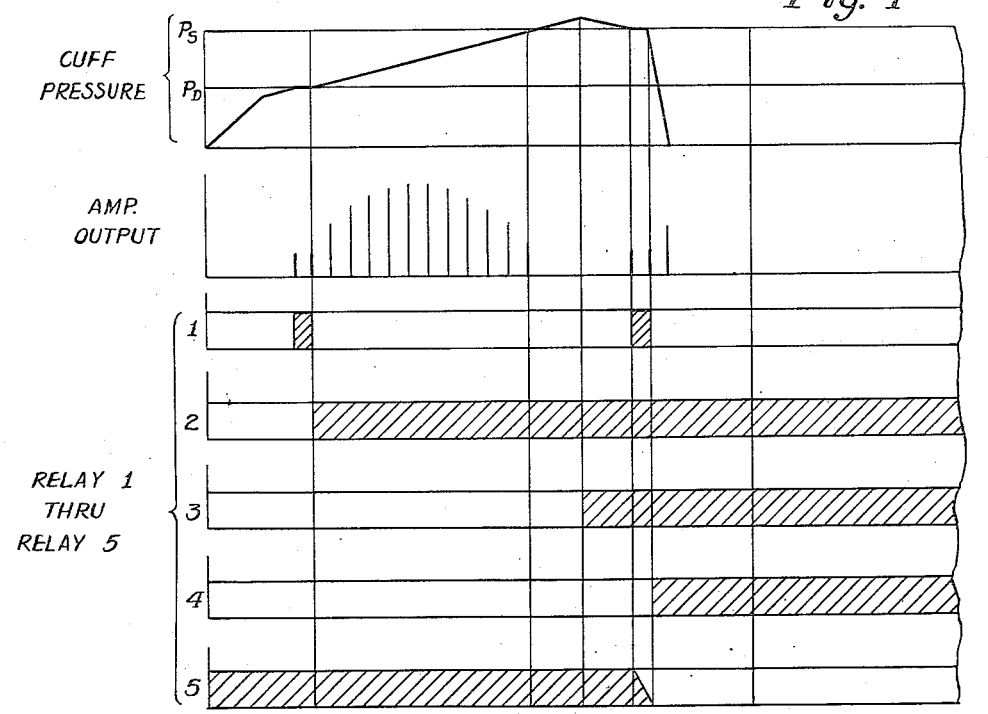

Figs. 3A–3C together form a complete schematic diagram of the sphygmomanometer;

Fig. 3D is a chart indicating the arrangement of Figs. 3A–3C;

Fig. 4 shows the response curve for the microphone amplifier portion of the circuit shown in Fig. 3A and;

Fig. 5 is a timing diagram showing the positions of the relays of Fig. 3C throughout a measuring cycle.

Figure 1:
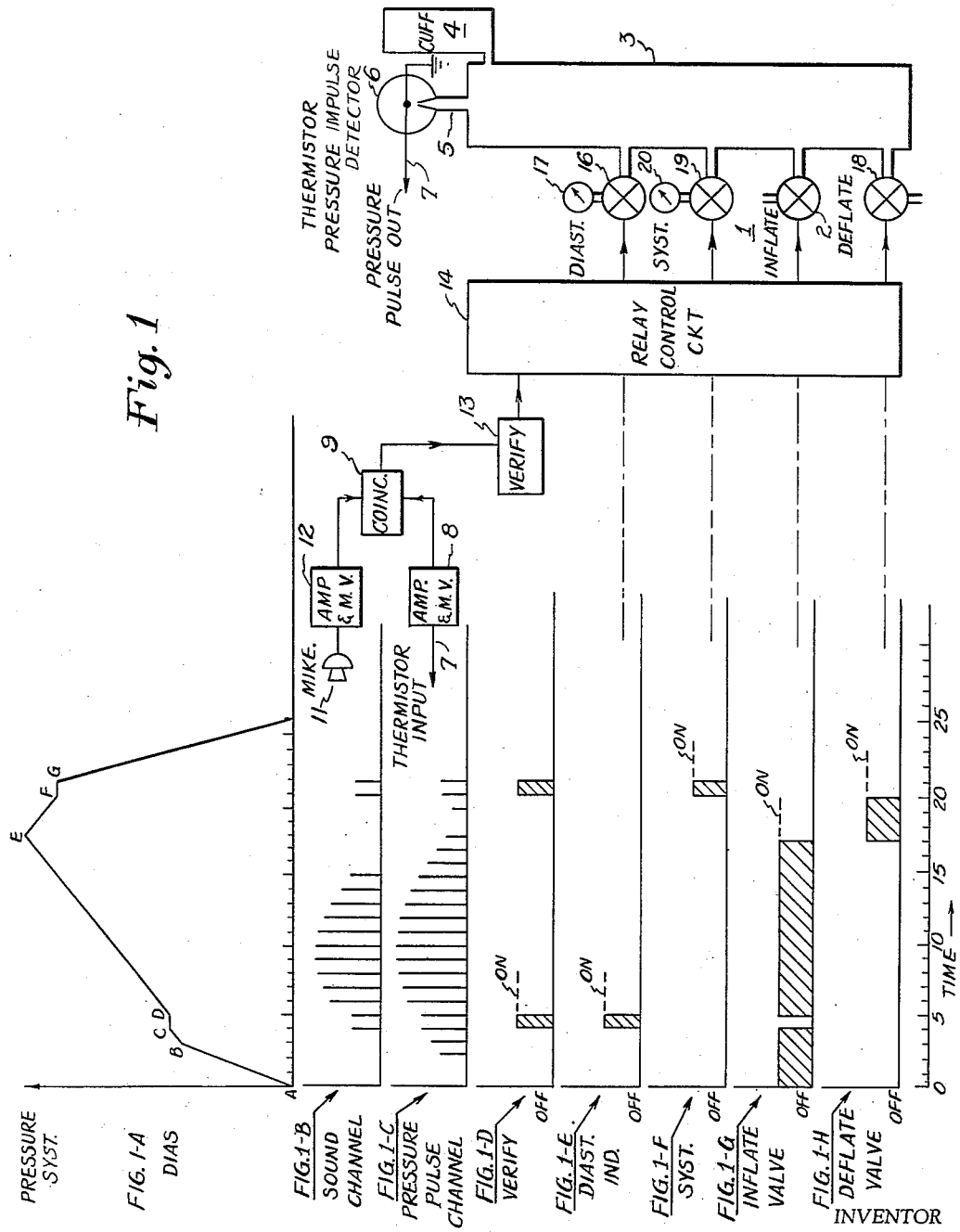

Referring to the drawings in which similar elements are denoted by like reference numerals, Fig. 1 shows in block form the over-all structure of applicant's system.

A microphone 11 is coupled through a first or sound channel amplifier circuit 12 to a coincidence circuit 9. Likewise thermistor signals via lead 7 pass through a second or pressure pulse channel amplifier circuit 8 to coincidence circuit 9. The output of coincidence circuit 9 is fed to a verification circuit 13 and also to a relay control circuit 14. This latter circuit functions to control two valves 16 and 19 as well as a compressor inlet valve 2 supplied by a compressor inlet represented generally by the numeral 1. Valves 16 and 19 control the flow of air from an air reservoir 3 into a diastolic pressure meter 17 and a systolic pressure meter 20, respectively. Relay control circuit 14 also controls a deflate valve 18.

A passage 5 permits air to escape to a thermistor pressure impulse detector 6, the output of which is carried by lead 7. An occluding cuff also coupled to reservoir 3 is shown at 4.

Figs. 1A–1H illustrating the functions of certain elements in the system. Fig. 1A shows the pressure variations occurring in the system over an entire cycle of diastolic and systolic blood pressure measurements. Figs. 1B and 1C illustrate the sound and pressure pulses picked up in the respective channels while Fig. 1D illustrates the actuation of the verification circuit 13. Figs. 1E–1H illustrate the open and closed positions of the associated valves with which these figures are horizontally aligned. The diastolic and systolic valves are symbolized in Figs. 1E and 1F, respectively, as are the inflate and deflate valves shown in Figs. 1G and 1H. The pulse sequence symbolized in the diagrams of Fig. 1B–1H is based on a time scale defined by the interval in which the pressure cycle of Fig. 1A occurs. Such interval is variable depending upon the pressure values of each particular subject and the time scale indicated at the bottom of the chart in Fig. 1 is therefore arbitrary, the indicated calibrations being useful in correlating the various diagrams.

Figure 2:
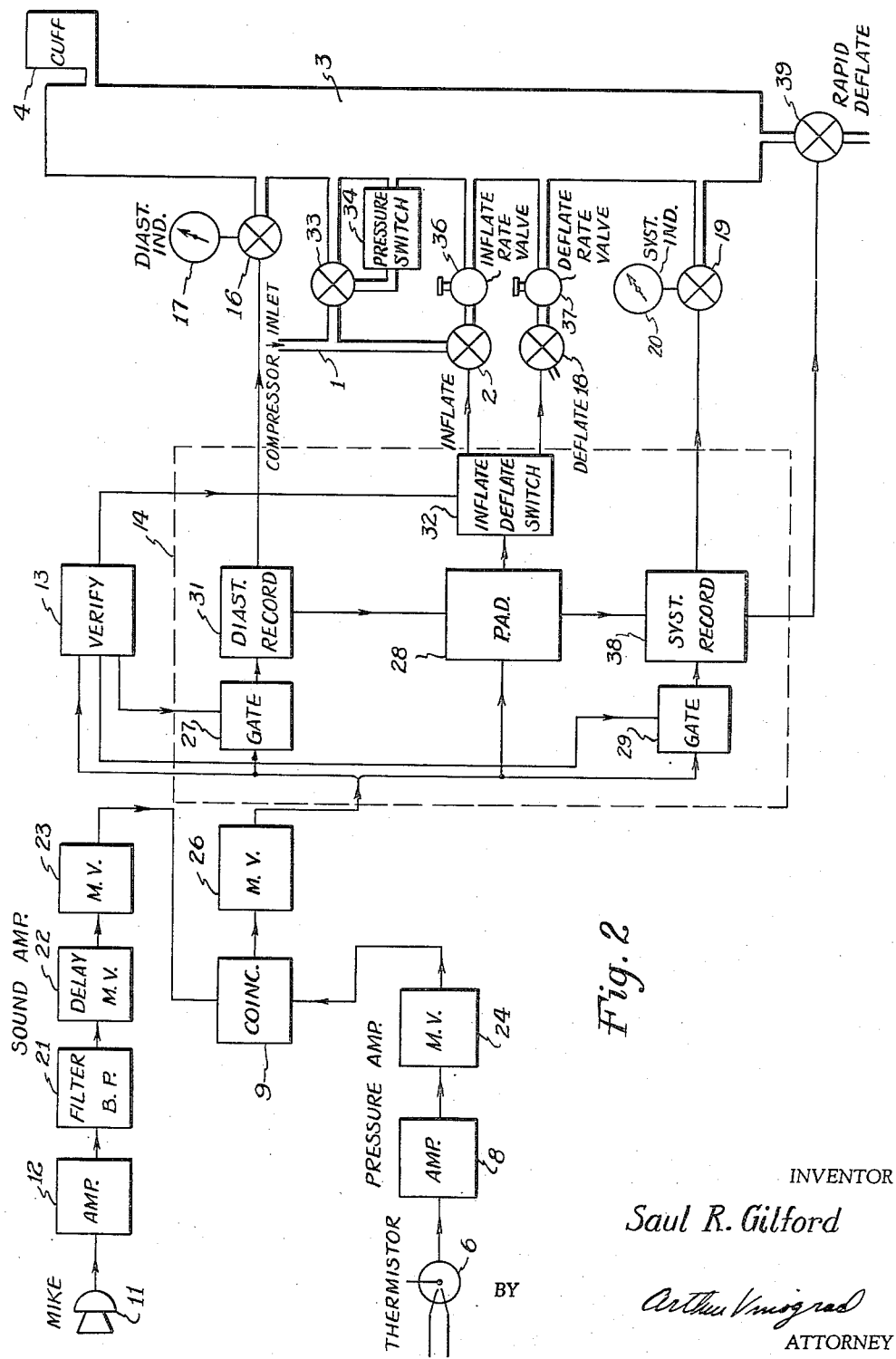
Fig. 2 is a block diagram of applicant's invention showing the relation between the electrical system and the measuring apparatus.

Reference is now had to Fig. 2 which shows the system of the instant invention with the electrical circuitry in more detailed block form and with elements corresponding to like elements in Fig. 1 bearing the same numbers. The sound detected at microphone 11 passes through amplifier circuit 12, a band-pass filter 21, a delay multivibrator 22, and a pulse shaping multivibrator 23 to coincidence circuit 9. In the pressure channel pulses from thermistor 6 are fed through amplifier 8 and a second pulse shaping multivibrator 24 to coincidence circuit 9. Another pulse shaping multivibrator 26 couples coincidence circuit 9 to relay control circuit 14 shown in dashed lines and to vertification circuit 13. Relay control circuit 14 comprises a first gate 27 coupled to a diastolic pressure recording circuit 31 and a second gate 29 coupled to a systolic pressure recording circuit 38. A pulse absence detector 28 and an inflate-deflate switch 32 comprise the remainder of control circuit 14.

Also shown in Fig. 2 are inflate rate and deflate rate valves 36 and 37, respectively for manually controlling the rate at which air is supplied to and taken from the system. A rapid inflate valve 33 controlled by a pressure-sensitive switch 34 provides for rapid inflation of the system from the air supply at the beginning of a measuring cycle. Likewise a rapid deflate valve 39 is provided to rapidly exhaust the system at the end of a cycle.

Referring now to Figs. 3A–3C which form a single schematic diagram of the complete system of the instant invention when arranged as shown in Fig. 3D there is shown in Fig. 3A a representation of a human limb 42, an occluding cuff 4, a microphone 11 with securing means 41, sound cable connection 47, and thermistor cable connection 48. Air is supplied to cuff 4 via line 46.

The remaining portions of Fig. 3A show in detail the circuitry of the correspondingly labeled blocks of Fig. 2. The particular circuits of each block are conventional and need not be further described.

Fig. 3B shows in detail relay control circuit 14, verification circuit 13, and the various relays that are controlled. Circuit 14 comprises a first tube $T_1$ cathode coupled through a relay $R_1$ to a second tube $T_2$. A tube $T_4$ is coupled to multivibrator 26 of Fig. 3A through lead 56. A relay $R_2$ is included in the cathode circuit of tube $T_4$. Another tube $T_5$ with associated resistor 97 and capacitor 96 is coupled to the cathode of tube $T_4$ through two series resistors 83 and 98. A tube $T_6$ with a cathode relay $R_3$ is also coupled to tube $T_5$ through resistor 97. The tubes $T_5$ and $T_6$ with associated circuitry constitute the pulse absence detector 28. Relay control circuit 14 includes another tube $T_7$ having a resistor 76 and a relay $R_4$ connected to its cathode. Also included in circuit 14 is a delay circuit comprising resistors 91, 93, and 94 and capacitor 92, as well as additional components comprising a resistor 102 and a capacitor 103, the latter being shunted by another relay $R_5$.

Tube $T_3$ along with resistors 86 and 87 as well as capacitor 85 comprises the verification circuit 13.

Also shown in Fig. 3B are the various relay switches numbered $R_1S_1$, $R_2S_2$, etc., the first subscript referring to the relay with which the switch is associated and the second subscript referring to the particular switch. All the relay switches shown are single pole double throw switches.

Switch $R_1S_2$ is coupled to switch $R_3S_2$ via lead 66 and to switch $R_3S_1$ via lead 67. Lead 71 couples switch $R_1S_3$ to resistor 91. Switch $R_2S_1$ is coupled to tube $T_1$ by lead 84 and to switch $R_3S_3$ by lead 73. Lead 72 couples switch $R_3S_1$ to switch $R_4S_2$ and lead 77 couples switch $R_3S_4$ to switch $R_4S_1$. Leads 74 and 78 couple switch $R_4S_1$ to tube $T_7$ and resistor 76, respectively, while lead 79 couples switch $R_4S_3$ to resistor 102 and lead 82 couples switch $R_5S_2$ to pulse absence detector 28.

Various other leads and connections indicated in the drawings are unnumbered and should be obvious to one skilled in the art.

Fig. 3C shows lead 65 which couples switch $R_1S_2$ to a plus 24-volt power supply 60. Another lead 69 couples switch $R_2S_2$ to the diastolic valve coil and lead 64 couples a manual starting switch $S_1$ and an automatic starting switch $S_2$ to the relay circuitry of Fig. 3B. Fig. 3C further shows a positive 250-volt power supply 101, a safety switch 104 and a minus 150-volt power supply 70. A lead 107 is also shown which couples switch $R_4S_2$ of Fig. 3B to the coil of systolic valve 19. A lead 108 couples switch $R_3S_2$ to the coil of deflate valve 18 and another lead 109 couples switch $R_3S_2$ to the coil of inflate valve 2.

Leads 111 and 112 provide coupling to a variable gain control potentiometer for sound channel amplifier 12 while two leads 113 and 114 couple the sound and pressure channel amplifiers to two neon tubes for visibly indicating the presence of pulses in those amplifiers. A cycle complete lamp 81 is indicated as connected to switch $R_5S_1$. Lead 116 completes the circuit to switches $S_2$ and $S_1$ and lead 106 couples switch $R_5S_1$ to the coil of rapid deflate valve 39.

GENERAL DESCRIPTION OF OPERATION

Generally the function of the system is as follows. Upon initiation of a cycle, air is supplied to the system by compressor inlet 1 Fig. 2 through the open inflate valve 2 to the main reservoir 3. The pressure starts to increase along the line A—B in Fig. 1A. At some point below B pressure pulses begin to be felt at the occluding cuff 4, which is wrapped tightly about the patient's arm. These pulses are shown in Fig. 1C at $t=3$ approximately. The variations in pressure are transmitted to reservoir 3 which allows the air to pass through nozzle 5 (Fig. 1) to thermistor 6. These variations in pressure cause slight gusts of cooling air to pass through nozzle 5 and across thermistor 6 which acts as a sensitive transducer changing the pressure variations into electrical pulses. The transduced pulses are supplied to pressure channel amplifier 8 by way of lead 7 and then on to coincidence circuit 9 (Fig. 2).

Since the pressure has not yet reached the diastolic point no sounds are heard. It can be seen by comparing Figs. 1C and 1B at such time period, that the pulses received from the pressure channel and applied to the coincidence circuit 9 begin before sounds are heard and die out after the sound pulses have disappeared. While the pressure channel pulses themselves may be used to determine the diastolic and systolic pressure points, it can be seen that they do not begin and die out at the same values of pressure as do the sound pulses and therefore cannot be used directly to determine the diastolic and systolic pressures.

Instead, applicant utilizes the fact that the pressure variations arising from expansion and contraction of the artery due to the variation in blood flow occur at substantially the same time as the sounds caused by the collapsing artery walls in providing the present method of gating out undesired signals picked up in the sound channel by microphone 11. Thus, for example, if movement of the patient introduces a sound pulse into the microphone 11, such pulse cannot be transmitted through coincidence circuit 9 unless it occurs at the same time that a pressure pulse is transmitted from occluding cuff 4. If the sound pulse does not occur at the time of a pressure pulse it is blocked by coincidence circuit 9.

At an arbitrary point B (Fig. 1A), slightly below the diastolic pressure, the rate of increase of pressure in the system is reduced. The reduction in pressure rate of increase is brought about by the relatively simple by-pass valve 33, the operation of which will be fully explained later. The rapid increase of pressure in the system from A to B is incorporated in the system to shorten the length of time that the cuff remains inflated on the patient's arm. At point B the increase in pressure is more gradual until the first pulse appears at the microphone when the pressure reaches the diastolic value of point C.

Upon reception of the first sound pulse at period $t=4$ for example, several operations occur simultaneously. The relay control circuit 14 functions to close inflate valve 2 (Fig. 2), so that the pressure in the system remains constant as shown by line C—D in Fig. 1A. Likewise relay control circuit 14 serves to open valve 16 so that the system pressure may be recorded in meter 17. The actuations of valves 2 and 16 are symbolized in Figs. 1G and 1E, respectively corresponding to $t=4$.

It will be further noted from Fig. 1D that reception of the first sound pulse at such period coincident with a pressure pulse activates verification circuit 13. This circuit incorporates a 1.5 second delay so that if no second pulse is heard over the microphone after 1.5 seconds, the valve 2 is reopened and valve 16 is closed. In other words, the verification circuit "listens" for a second gated pulse for a period of 1.5 seconds. If no second gated pulse appears in the output of the coincidence circuit 9, the verification circuit 13 then operates relay control circuit 14 so that the conditions prevailing between points B and C on the pressure curve are restored. In this manner the verification circuit 13 can detect a "false" pulse (i. e., a pulse such as a spurious noise that does not appear again) and reset the relays so that the pressure continues to increase until a verified pulse appears. The 1.5 second delay is chosen so that enough time is allowed for a second pulse to appear even for a patient with a very low pulse rate, such as forty a minute.

Upon verification of the first pulse by reception of a second gated pulse, the verification circuit 13 is deactivated as shown in Fig. 1D, corresponding to point D ($t=5$) on the pressure curve of Fig. 1A. At the same time relay control circuit 14 closes valve 16 as indicated in Fig. 1E with the true diastolic pressure recorded on meter 17 and also opens inflate valve 2 as shown in Fig. 1G so that the system pressure resumes its gradual rise represented by line D—E of Fig. 1A.

The pressure gradually rises to the systolic value where, as shown in Fig. 1B, the sound pulses disappear. A delay unit in relay control circuit 14 previously held inoperative by the sound pulses allows the pressure to increase beyond the systolic value before the delay unit closes inflate valve 2 at point E on the pressure curve of Fig. 1A. At the same time that valve 2 is closed, deflate valve 18 opens, as shown in Fig. 1H, at $t=16.5$ approximately, causing the system pressure to slowly decrease along the line E—F.

At point F ($t=20$) a sound pulse is again heard, representing the systolic pressure value. Verification circuit 13 is actuated and functions in a manner similar to that previously described with respect to the diastolic pressure reading. At the same time deflate valve 18 closes, maintaining a constant pressure along line F—G, while valve 19 opens allowing the systolic pressure to be recorded on meter 20.

Upon verification by a second gated pulse valve 19 closes, permanently recording the systolic pressure in meter 20, and a rapid deflate valve 39 (Fig. 3C) opens, rapidly deflating the system pressure to atmospheric pressure.

Sound pulses appearing at microphone 11 are transmitted to amplifier 12, and then on to band-pass filter 21. The output of filter 21 is applied to delay multivibrator 22 where the pulses are delayed before being applied to pulse-shaping multivibrator 23. Multivibrator 22 provides a variable delay which is adjusted to a value equal to the inherent delay in the pressure channel. From multivibrator 23 the sound pulses are fed to coincidence circuit 9.

The electrical pulses from thermistor-transducer 6 are amplified in the pressure channel by amplifier 8 and applied to pulse-shaping multivibrator 24 where the pulses are shaped and are also applied to coincidence circuit 9.

It should be noted that the present invention provides two distinct features for distinguishing undesired noise from the desired sound pulses. Very often noises due to the movement of the patient or external noise is picked up by the microphone and would ordinarily actuate the circuit. Applicant almost completely avoids such undesired activation by utilizing the pressure pulses to gate the sound. In this way any sound occurring at a time that no pressure pulse is received will not pass through the coincidence circuit 9. Secondly, the verification circuit 13 requires that two successive pulses be transmitted through the coincidence circuit within a predetermined period before a permanent recording of the pressure is made.

The output of coincidence circuit 9 is supplied to a third pulse-shaping multivibrator 26 where the pulses are shaped for application to the relay control circuit 14. The pulses supplied to relay control circuit 14 are applied to three separate channels in that circuit as will be described. The signals are applied to verification circuit 13 and likewise to gate 27, pulse-absence detector 28 and another gate 29.

Upon reception of two successive diastolic-pressure value pulses the verification circuit opens the gate 27 passing pulses to diastolic recording circuit 31. Diastolic recording circuit 31 momentarily opens valve 16, allowing the diastolic pressure to be recorded by meter 17. At the same time verification circuit 13 through inflate-deflate switch 32 closes valve 2 momentarily holding constant pressure in the system.

As shown in Fig. 2 valve 2 is by-passed by a rapid inflation valve 33 which is controlled by a pressure-sensitive switch element 34. Pressure is rapidly built up in the system from compressor inlet 1 through valve 33. However, at point B of Fig. 1A pressure-sensitive element 34 reacts to the system pressure and functions to close valve 33. The referred-to reduced rate of system-pressure increase is adjusted by flow-rate valve 36 to give the desired rate of increase near the diastolic pressure value.

Actuation of diastolic-recorder circuit 31 readies pulse-absence detector 28 for the cessation of pulses as the system pressure arises above the systolic value.

When pulses are no longer received, the pulse-absence detector 28 after a short time delay activates the inflate-deflate switch 32 so that inflate valve 2 closes and deflate valve 18 opens. The deflation rate is adjusted by flow rate valve 37. The pulse-absence detector 28 likewise activates systolic-recorder circuit 38. Now, upon reception of pulses at the systolic pressure value, verification circuit 13 opens gate 29, allowing systolic-recorder circuit 38 to momentarily open valve 19 so that the systolic pressure is recorded by meter 20. During the time of verification, deflate valve 18 is closed momentarily, maintaining constant pressure in the system.

Systolic-recorder circuit 38 includes a slow-acting relay which, after a short time allowing for all actions to be completed, opens rapid-deflate valve 39 which completely exhausts the system and ends the measuring cycle.

DETAILED DESCRIPTION OF OPERATION

The over-all functioning of the apparatus having been generally described, the operation of the various components will be described in detail, reference being made to Figs. 3A-3C which form a single schematic when arranged according to the diagram of Fig. 3D.

Referring to Fig. 3A, at 42 is shown generally the representation of a human arm with the occluding cuff 4 surrounding it and closing off an artery. Also surrounding arm 42 is a tape 41 or other fastening means for securing microphone 11 to the arm. Air is supplied to the cuff 4 by means of tube 46 which is connected to the main reservoir 3.

At 47 and 48 cable connections are shown for the microphone signal pulses and the pressure gating pulses, respectively. The signal pulses are received directly from the microphone as shown. The pressure variations in the cuff arising from the variations in blood flow through the artery are transmitted along tube 46 to the main reservoir 3 shown in Fig. 3C. The momentary variations in pressure thus occurring in the reservoir 3 cause air to be transmitted across thermistor-transducer 6 (Fig. 3C) by way of nozzle 5 in the reservoir 3. The passing air causes variations in the thermistor resistance due to the cooling effect of the passing air and these variations are manifested as a voltage signal on lead 52. These signals are transmitted by means of lead 52 to connection 48 in Fig. 3A and thence to the pressure channel amplifier 8.

The low level output of the direct contact type piezo-electric crystal microphone 11 must be increased by sound channel amplifier 12 to provide sufficient energy to operate the relay system through which the measurement functions of this instrument are carried out.

The sound amplifier section 12 is confined to the upper left portion of the diagram and is a conventional resistor-capacitor coupled type. A gain of approximately 80 decibels is realized from the first two stages. An additional stage of gain is required to bring the signal level up by a factor of five before going through 3-section RC filter network 21. Fig. 4 shows the amplitude-frequency characteristic for the amplifier-filter system. Since the desired signals contain primarily frequencies in a range centered around 100 it is desirable to reduce the amplification at frequencies outside this range. The low-pass filter produces the gradual roll-off of the high frequencies while the incomplete cathode bypassing and RC time constants cause the low frequency degradation.

The output of the filter is introduced into a signal delay circuit and equalizing circuit in the form of a cathode-coupled one-shot multivibrator 22 consisting of both halves of tube $V_1$ and associated network. Tube $V_2$ serves as a buffer stage which makes the triggering of the multivibrator 22 less dependent on the amplitude and waveform of the incoming pulses. The general characteristics of a multivibrator employed in such manner are well known and are described on pages 87–91 of "Electronics Experimental Techniques" by Elmore and Sands published by McGraw-Hill, 1949. In general, in response to an initiating pulse such as obtained from filter 21, such multivibrator will conduct and produce a square wave output for a duration determined by the time constant of the particular circuit employed as is well known. Potentiometer 54 shown in Fig. 3A provides a convenient means for selectively determining such time constant. By utilizing the trailing edge of such square wave a time delay corresponding to the period of duration of the square wave output is achieved. The purpose of delay multivibrator 22 is to compensate for the delay occasioned by tube 46 in which the pressure pulses travel a substantial distance between cuff 4 and signal transducer 6. The delay provided by multivibrator 22 can be controlled by variable resistor 54 and is adjusted to provide a delay interval for the sound pulse associated with a pressure pulse so that the pressure pulse signal applied to coincidence gate 9 will bias the latter for conduction prior to the arrival of a corresponding sound pulse. The delayed microphone signals from multivibrator 22 are then applied to pulse-shaping multivibrator 23 in which the microphone signal pulses are shaped in a proper form for application to coincidence circuit 9.

The gating pulses received at connection 48 are amplified by amplifier 8 and applied to pulse-shaping multivibrator 24 where they also are shaped for application to coincidence circuit 9. When the pulses are received at each tube of coincidence circuit 9 in phase, an output is derived therefrom and applied to another pulse-shaping multivibrator 26 in which the output pulses are shaped in suitable form for application via lead 56 to the control circuit shown generally at 14, appearing in Fig. 3B of the drawings.

*Table 1*

| Relay | Unener- gized state | Start of cycle | Relays Energized | | | | | End of cycle |
|---|---|---|---|---|---|---|---|---|
| | | | 1 | 2 | 3 | 4 | 5 | |
| 1 | O | O | O | O | C | C | O | O |
| 2 | O | O | O | C | C | C | C | C |
| 3 | O | O | O | O | O | C | C | O |
| 4 | O | O | O | O | O | C | C | O |
| 5 | O | O | C | C | C | C | O | O |

Referring to the control circuit 14, Table I shows a chart of the positions of relays $R_1$ through $R_5$ for the various sequential steps of the operation of the control circuit of Fig. 3B. The first column indicates the relay referred to, and the second column shows that in the unenergized state all the relays are in the open position.

As can be seen from Table I and from Fig. 5 which graphically shows the closed and open positions of the relays, relays 2, 3, and 4 are so arranged that once they are energized they stay closed for the remainder of the cycle. However, relay $R_1$ is concerned with the verification circuit including the recording of both the diastolic and systolic pressure and is therefore required to close and open twice during the blood-pressure reading cycle.

Relay $R_5$ is concerned with the safety feature of the normally open rapid deflation valve 39, and it is therefore required that this valve be open when no power is applied to the circuit, i. e., in case of a power failure. Likewise it is required that this valve be closed at the beginning of the cycle so that pressure can build up in the reservoir but it must open at the end of the cycle to provide for rapid deflation of the cuff once the readings have been taken.

Referring back to Figs. 3A-3C, the measuring cycle is initiated either by manual switch $S_1$ or program switch $S_2$. This is accomplished by breaking momentarily the 250-volt power supply to the circuit and allowing the relays $R_2$, $R_3$, and $R_4$, which were closed at the end of the previous cycle to assume their unenergized or open position. The programming switch $S_2$ may be actuated by a timed cam or any other suitable timing device.

When either $S_1$ or $S_2$ is opened, the relays $R_2$ and $R_4$ assume the open or unenergized positions, since no B+ power is supplied to the control circuit through the switches. When the switch is released, power is supplied to the control circuit and relays $R_1$, $R_2$, and $R_4$ remain open, relay $R_3$ opens and relay $R_5$ closes in a manner to be explained later. Fig. 3B shows the relay switches as they appear at the beginning of a cycle with relays $R_1$–$R_4$ open and relay $R_5$ closed.

The cycle commences when either the switch $S_1$ or $S_2$ is momentarily opened, and, upon closing, pressure starts to build up in the system. No sound is heard on the microphone until the diastolic pressure is reached, and it is the first sound from the microphone gated by the pressure pulse that initially serves to activate relay $R_1$.

Assuming that a pulse is received simultaneously from both the microphone circuit and the pressure gating circuit, then the coincidence circuit passes a signal pulse to the control circuit. Since tube $T_2$ is normally conducting, a pulse on the grid of $T_1$ raises the slightly negative bias on the grid of that tube so that current passes through both $T_1$ and $T_2$, and relay $R_1$ is energized.

The relay switches are grouped according to the relays that activate them. When relay $R_1$ closes the three switches, $R_1S_1$, $R_1S_2$, and $R_1S_3$ are activated. The closing of $R_1S_1$ places B+ 250 volts supplied via the power supply line 64 through the lower contact of $R_1S_1$ on the plate of delay tube $T_3$, whose function will be explained later.

As can be seen, voltage source 60 provides +24 volts via lead 65, the upper contact of $R_1S_2$, lead 66, and the upper contact of $R_3S_2$ to activate and hold open inflation valve 2 so the pressure in the system may buildup. The closing of $R_1S_2$ breaks this connection, closing valve 2 and maintaining the pressure in the system constant. With the center contact of $R_1S_2$ in its lower position, source 60 now supplies +24 volts via the lower contact of $R_1S_2$, lead 67, the upper contact of $R_3S_1$, and lead 69, to the diastolic valve 16, thus opening it and allowing meter 17 to record the pressure.

The closing of $R_1S_3$ removes the negative bias of −150 volts from B− supply 70 that has been applying a large negative voltage to bias tubes $T_4$ and $T_7$ through lead 71. With the negative bias on the grid of tube $T_4$ slowly decreased to about −30 volts, this tube can now be rendered conducting by the incoming pulses that are being supplied to it, thus activating and closing relay $R_2$. The negative bias from source 70 is normally applied across resistor 91 and the parallel combination of capacitor 92 and resistor 93 by way of lead 71 so that the tubes are biased approximately at −150 volts. However, with $R_1S_3$ closed the −150 volts is applied across resistor 94 and the parallel combination of capacitor 92 and resistor 93. The values of resistors 91, 93, and 94, are chosen so that the voltage appearing at the junction of resistors 93 and 94 is approximately −30 volts or about one-fifth of its previous magnitude. Capacitor 92 provides a slight delay in the bias voltage change to provide time for the verification (which will be explained later) to take place.

The closing of $R_2S_1$ removes B+ from tube $T_1$, thereby deactivating relay $R_1$ and resetting it in the open position. Relay switch $R_2S_1$ places this B+ on the plates of $T_5$ and $T_6$ which act together as a pulse-absence detector. The closing of $R_2S_2$ breaks the +24-volt circuit to the coil of valve 16 and closes that valve, thus capturing the diastolic pressure reading.

It should be noted that the resetting of relay $R_1$ restores the original function of its relay switches and resets it so that it would again be sensitive to pulses except for the fact that there is no connection for the B+ supply to the plate of tube 1, this connection having been broken by the closing of $R_2S_1$.

The point in the cycle has been reached where the diastolic pressure has been recorded, and the pressure in the system is increasing to the systolic range where the sounds will disappear.

With $R_2S_1$ placing B+ on the plates of both tubes $T_5$ and $T_6$, these tubes both are capable of being rendered conductive by overcoming the negative bias on each grid. The bias on tube $T_5$ is overcome with each pulse causing this thyratron tube to fire with the incoming pulses. In between pulses the voltage across capacitor 96 builds up only to be discharged through the tube as it fires. However, when the incoming pulses die out tube $T_5$ no longer fires, and the voltage across capacitor 96 increases to a large value raising the potential on the grid of thyratron tube $T_6$, causing this tube to fire and thus activating relay $R_3$. The pulse-absence detector 28, including tubes $T_5$ and $T_6$, maintains $R_3$ unactivated during the reception of pulses but a short time after the pulses die out (which depends on the charging time constant of capacitor 96 in series with resistors 97 and 98.) the pulse-absence detector causes relay $R_3$ to be actuated.

The firing of tube $T_6$ energizes relay $R_3$. The closing of relay switch $R_3S_1$ serves no immediate useful purpose, since $R_1S_2$ is in the up, or open, position, and lead 67 is not connected to any potential source at its upper end. The activation of $R_3S_2$ transfers +24 volts from the inflate coil to the deflate coil, causing the former to close and the latter to open.

$R_3S_3$ serves to place B+ back on $T_1$ by way of lead 73, readying this tube and its associated circuit for the reception of the first systolic pressure sounds as the pressure decreases from E to F in the graph of Fig. 1A. $R_3S_4$ places B+ on $T_7$ via lead 74, likewise readying this tube for the first pulse sounds at the systolic pressure.

On reception of pulses at the systolic pressure value, realy $R_1$ closes and $R_1S_1$ again places B+ on the time delay for purposes to be explained later. $R_1S_2$ again closes, placing +24 volts on the systolic valve actuating coil, causing valve 19 to open. This connection is made via lead 67 through the lower contact of $R_3S_1$, which now serves the purpose for which it previously closed, through lead 72 and on to the systolic valve solenoid. $R_1S_3$ again removes the large negative bias from the tubes including tube $T_7$, which is made ready to function.

Now with B+ applied by the closure of $R_3S_4$, tube $T_7$ can be rendered conducting upon the receipt of pulses from multivibrator 26. This energizes relay $R_4$, which closes $R_4S_1$, placing B+ on resistor 76 via the lower contact of $R_3S_4$, lead 77, $R_4S_1$, and lead 78, causing the closure of relay $R_4$. Switch $R_4S_2$ breaks the circuit to the systolic valve actuating coil, causing valve 19 to close, and the systolic pressure to be captured by meter 20.

Switch $R_4S_3$ removes B+ from relay $R_5$ supplied thereto by lead 79, causing relay $R_5$ to be de-energized and to open. The relay $R_5$ is of the slow release type, allowing time for all actions to be complete before ending the cycle.

After the short delay when $R_5$ opens, switch $R_5S_1$ removes the +24 volts from the rapid deflate solenoid, causing valve 39 to return to its unenergized open state and rapidly exhaust the pressure system. It also places the +250 volts from source 101 on the cycle-complete lamp 81, causing it to light.

Ignoring $R_5S_2$ for the moment, $R_5S_3$ serves to remove B+ from tube 1 so that any remote possibility of a relay cycle being inadvertently initiated, causing the relays to chatter, is completely eliminated.

Switch $R_5S_3$ along with $R_5S_2$ serves an additional very important purpose. Since relay $R_5$ controls normally open valve 39, its unenergized state must be open; that is, when no energy is supplied to the circuit, it must be open. Furthermore, it must also function to open at the end of the cycle to exhaust the pressure from the system. Thus it is required to be open when the circuit is not energized (e. g., power failure) and is also to go from closed to open at the end of the cycle, at which time the circuit is energized. In other words, relay $R_5$ must be closed immediately upon the application of energy to the unit.

Such action is accomplished by lead 80. Since $R_5S_3$ normally rests against its lower contact, any B+ applied to the circuit will be carried by lead 80 to resistor 76. This means that $R_4$ is energized the moment the circuit is plugged into a voltage supply. The closing of $R_4$ assures that $R_5$ will remain open for the time that the circuit is energized but during which no cycle is initiated. In this way it is impossible for pressure to build up in the system when the device is plugged in but not being used, since, with relay $R_4$ positively positioned closed, relay $R_5$ is held open, thus keeping rapid deflate valve 39 open. Likewise $R_5S_2$ places B+ on tube $T_6$ via lead 82, causing relay $R_3$ to close and puts B+ on resistor 83, closing relay $R_2$.

In other words, $R_5S_2$ and $R_5S_3$, since they are in the normally open or down position, are used to position the relays in the end-of-cycle position immediately upon plugging in the device to a voltage supply by closing relays $R_2$—$R_4$. Then, when either $S_1$ or $S_2$ is momentarily opened, relays $R_2$ and $R_4$ are deenergized open and assume the start-of-cycle position. The switch opening causes $R_5$ to be energized from separate B+ source 101, causing $R_5$ to close and likewise assume its start-of-cycle position.

In order to insure that with the initial energization of the circuit relay $R_5$ will be open, a time delay consisting of resistor 102 and capacitor 103 is incorporated in the circuit of relay $R_5$. Thus plugging in the circuit will serve to close relay $R_4$ through $R_5S_3$ and lead 82, since relay $R_4$ has no such delay circuit. In this way relay $R_4$ is closed before relay $R_5$ has a chance to close. As can be seen from the drawing, the closure of $R_4$ by means of switch $R_4S_3$ removes power from relay $R_5$ and insures that it will remain open until relay $R_4$ is subsequently opened upon the initiation of a measuring cycle.

It has been noted that applicant's invention incorporates a verification, or time delay, in the pressure system before each pressure reading. This is accomplished by means of tube $T_3$ shown in Fig. 3B. Upon the reception of the first diastolic pressure value pulse, for example, $T_1$ conducts, closing relay $R_1$ and opening the diastolic valve 16. Likewise, the pressure inflation valve is closed, and the increase in pressure of the system halted. If a second pulse is received within approximately 1.5 seconds the cycle continues, as has been described. If no second pulse is received the voltage applied through $R_1S_1$ causes capacitor 85 to charge positively through resistors 86 and 87. The R–C time constant of this circuit is chosen as about 1.5 seconds, or more than a sufficient time for a second pulse to be received as previously explained. After approximately 1.5 seconds, the voltage across capacitor 85 builds up, causing $T_3$ to fire. This results in a negative pulse from the plate of $T_3$ to the grid of tube $T_2$ rendering $T_2$ nonconducting and deenergizing relay $R_1$. With relay $R_1$ again opened, the inflation valve 2 reopens and the pressure resumes its gradual rise. Likewise valve 16 is closed awaiting a new higher diastolic pressure reading. This circuit operates similarly for the systolic pressure reading.

Pressure switch 104 is an adjustable safety switch whose contacts open when a preset pressure has been exceeded. In normal use a setting would be made which allows a margin of at least 30 mm. above the maximum anticipated systolic pressure. The actuation of switch 104 opens $R_5$ which brings the system to the state which it normally reaches at the end of a measurement cycle. Under this condition, as has been described previously, the rapid deflate valve 39 is open and the cuff deflated. The system is then in stand-by condition in readiness to go through the next measurement cycle, when initiated.

In putting the system into operation after attachment of the cuff and microphone, it is only necessary to adjust the gain in the system to the characteristic sound level of the subject. First the auscultatory diastolic pressure is determined. The cuff is then inflated to this value and held while the gain control is increased until the threshold indicator begins to pulsate. This is the proper gain setting for the subject, and it is left undisturbed after the initial setting.

The instrument has been used on many different subjects for periods ranging from an hour to as long as 18 hours under hospital conditions. In general, there appears to be no patient discomfort and after an initial period of patient adjustment, the normal activity of a bed patient is undisturbed.

Preliminary work shows that there is a good agreement of the instrument values with auscultatory values over the full range of pressures encountered in normals and hypertensives. Changes in pressure following the administration of drugs affecting blood pressure are followed by the instrument. At present the programming switch repeats the measurement cycle once every three minutes. The actual determination takes about one minute or less for the normal range of pressures but is dependent upon the maximum pressure the system must reach.

The important features of applicant's invention may be summarized as follows:

(1) The captured pressure arrangement makes it possible to obtain and hold or record the diastolic and systolic blood pressure readings.

(2) The feature of increasing the pressure beyond the systolic range and then decreasing it provides a more accurate determination of the systolic pressure value.

(3) Applicant's control system is entirely electrical utilizing commercially available components, thus making it more economical to manufacture.

(4) The rapid increase of pressure to a point just below the predetermined diastolic level allows the cuff to be inflated for a shorter period of time.

(5) Three safety features incorporated in applicant's device: (a) the electrical maximum-pressure control, (b) a mechanical pop-off valve (not shown), and (c) the normally open exhaust valve.

(6) The features relating to increasing the ability of the present sphygmomanometer to distinguish desired signals from undesired noise: (a) the direct-contact type microphone, (b) the narrow-band audio amplifier, (c) the verification circuit, and (d) the gating by means of pressure pulses.

It will be apparent that the embodiments shown are only exemplary and that various modifications can be made. Instead of the captured pressure type meters 17 and 20 any conventional type recording meter might be actuated by the signals to valves 16 and 19 providing a display of the diastolic and systolic pressure values. Likewise the position of microphone 11 could be placed at various positions on arm 42 to provide optimum sound pick-up including placing it directly under the occluding cuff 4. These and other obvious modifications are felt to be within the scope of the present invention as defined in the appended claims.

What is claimed is:

1. An automatic sphygmomanometer including an occluding cuff, means for periodically inflating and deflating said cuff over a range of pressures including the diastolic and systolic pressures of a subject being tested, auscultatory means for obtaining electrical signals at said diastolic and systolic pressures, time-sensitive gating means coupled to said cuff for gating out noise signals passing through said auscultatory means and means responsive to said electrical signals for recording said diastolic and systolic pressure values.

2. An automatic sphygmomanometer comprising an occluding cuff, means for rapidly inflating said cuff to a predetermined pressure just below the diastolic pressure of a subject being tested, means for inflating and subsequently deflating said cuff over a pressure range including said diastolic and the systolic pressures of a human being, auscultatory means for obtaining electrical signals at said diastolic and systolic pressures, means including a thermistor transducer for gating out noise signals picked up by said auscultatory means, means responsive to said electrical signals for recording said diastolic and systolic pressure values and means for rapidly deflating said cuff.

3. An automatic sphygmomanometer comprising an occluding cuff, means for inflating and subsequently deflating said cuff over a range of pressures including the diastolic and systolic pressures of a human being, microphone means for obtaining electrical signals at said diastolic and systolic pressures, means for gating out most of the noise signals picked up by said microphone means, verification means for eliminating undesired signals passed by said gating means and means responsive to said electrical signals for recording said diastolic and systolic pressure values.

4. An automatic sphygmomanometer as defined in claim 3 in which said recording means includes means for directly displaying the diastolic and systolic pressure values.

5. An automatic sphygmomanometer comprising an occluding cuff, means for inflating and subsequently deflating said cuff over a pressure range including the diastolic and systolic pressures of a human being, microphone means for obtaining electrical signals at said diastolic and systolic pressures, means for gating out most of the noise signals picked up by said microphone means, verification means for eliminating undesired signals passed by said gating means, means responsive to said electrical signals for recording said diastolic and systolic pressure values and means for starting a new measuring cycle after a predetermined length of time.

6. An automatic sphygmomanometer comprising an occluding cuff adapted to be placed over the artery of a human being, means for inflating and subsequently deflating said cuff over a pressure range including the diastolic and systolic pressures of said human being, microphone means adjacent said cuff for deriving first electrical signals from said artery including means to detect sounds at said diastolic and systolic pressure levels, means for detecting the variations in pressure in said occluding cuff due to pulsation of said artery, transducer means for converting said pressure variations into second electrical signals, means for gating said first signals by said second signals, verification mean for eliminating noise components of said first signals passed by said gating means and means responsive to said first signals for recording said diastolic and systolic pressure values.

7. An automatic sphygmomanometer comprising an occluding cuff, pressure sensing means, means for inflating and subsequently deflating said cuff over a range of pressures including the diastolic and systolic pressures of a subject being tested, means connected to said sensing means including a transducer for obtaining first electrical signals at said measured diastolic and systolic pressures, ausculatory means for obtaining second electrical signals at said distolic and systolic pressures, coincidence means responsive to said first and second signals for deriving an output upon concurrence of said signals and means responsive to said output signals for recording said diastolic and systolic pressure values.

8. An automatic sphygmomanometer as defined in claim 7 in which said recording means includes means for permanently displaying a direct representation of said diastolic and systolic pressure values.

9. The device as defined in claim 8 including means for rapidly deflating said cuff at the end of a measuring cycle.

10. The device as defined in claim 9 including means for initiating a new measuring cycle after a predetermined length of time.

11. An automatic sphygmomanometer comprising an occluding cuff for application over an artery in a limb of a human being, means for rapidly inflating said cuff to a predetermined pressure below the diastolic pressure of said human being, means for inflating said cuff at a slower rate and subsequently deflating it at said slower rate over a range of pressures including said diastolic and the systolic pressures of said human being, microphone means adapted to be attached to said limb adjacent said cuff for detecting sound pulses caused by the occlusion of said artery and converting them into first electrical signals, means for detecting the variations in pressure in said occluding cuff due to pulsation of said artery, transducer means including a thermistor for converting said pressure variations into second electrical signals, gating means rendered conductive by said second electrical signals so that signals pass through said gating circuit only when they occur at the same time as said second signals, control circuit means for operating recording means which provide a permanent record of said diastolic and systolic pressure values and verification means coupled between said gating means and said control circuit means for rendering said control means inoperative if more than one pulse is not transmitted through said gating means over a predetermined period of time.

12. An automatic sphygmomanometer comprising an occluding cuff for application over an artery in a limb of a human being, means for coupling said cuff to an air reservoir, compressor means for rapidly increasing the pressure in said cuff and reservoir to a predetermined point below the diastolic pressure of said human being, means in conjunction with said pressure means for more slowly increasing the system pressure over a range including said diastolic and the systolic pressure of said human being, a microphone adapted to be attached to said limb adjacent said cuff for detecting sound pulses caused by the occlusion of said artery and converting said pulses into first electrical pulses, a thermistor transducer for detecting the pressure variations in said artery transmitted by said occluding cuff and converting said pressure variations into second electrical pulses, a gating circuit coupled to the output of said microphone and said thermistor transducer, variable delay means coupled between said microphone and said gating circuit for adjusting the phase of said first electrical pulses applied to said gating circuit to equal the phase of said second electrical pulses applied to said gating circuit, said gating circuit producing output pulses only when pulses received from said microphone and said thermistor transducer are in phase, first means responsive to said gating circuit output for recording said diastolic pressure value, means for slowly decreasing said system pressure over a range including said systolic pressure, second means responsive to said gating circuit output for recording said systolic pressure value, means for holding said system pressure constant during the recording of said pressure values, and verification means coupled between said gating circuit and said recording means for rendering said recording means inoperative when a first gating circuit output pulse is not followed by a second similar pulse in a predetermined time.

13. A device as defined in claim 12 in which said predetermined time is approximately 1.5 seconds.

14. A device as defined in claim 13 including means for rapidly deflating said system pressure after the systolic pressure value is recorded.

15. A device as defined in claim 14 including means for automatically repeating the recording of said diastolic and systolic pressures approximately every three minutes.

16. A device as defined in claim 15 in which said first and second recording means include means for providing a permanent direct display of said diastolic and systolic pressure values.

References Cited in the file of this patent

UNITED STATES PATENTS

| | | |
|---|---|---|
| 2,053,383 | Telson et al. | Sept. 8, 1936 |
| 2,272,836 | Gerdien | Feb. 10, 1942 |
| 2,571,124 | Farrand | Oct. 16, 1951 |
| 2,710,001 | Freyburger | June 7, 1955 |